(12) United States Patent
McGonagle

(10) Patent No.: US 6,797,304 B2
(45) Date of Patent: Sep. 28, 2004

(54) FRENCH PRESS COFFEE MAKER WITH ASSEMBLY TO SELECTIVELY REDUCE CONTACT OF GROUNDS WITH LIQUID COFFEE

(75) Inventor: Gary McGonagle, Lynn, MA (US)

(73) Assignee: Bonjour, Incorporated, Pacheco, CA (US)

( * ) Notice: Subject to any disclaimer, the term of this patent is extended or adjusted under 35 U.S.C. 154(b) by 226 days.

(21) Appl. No.: 09/951,233

(22) Filed: Sep. 13, 2001

(65) Prior Publication Data

US 2003/0047081 A1 Mar. 13, 2003

(51) Int. Cl.⁷ .............................. A23L 1/20; A23L 1/28; A23F 5/24; A23F 3/16
(52) U.S. Cl. ....................... 426/431; 426/495; 426/436; 426/433; 426/435
(58) Field of Search ................................ 426/425, 431, 426/435, 433, 495

(56) References Cited

U.S. PATENT DOCUMENTS

| | | |
|---|---|---|
| 2,053,021 A | 9/1936 | Cassol |
| 2,211,486 A | 8/1940 | Zoia |
| D181,143 S | 10/1957 | Gundelfinger |
| 2,900,896 A | 8/1959 | Bondanini |
| 2,935,928 A | 5/1960 | Keating et al. |
| 3,137,228 A | 6/1964 | Elow |
| 3,307,474 A | 3/1967 | Kasher |
| 3,927,608 A | 12/1975 | Doyel |
| 4,010,934 A | 3/1977 | McCord et al. |
| 4,650,583 A | 3/1987 | Bondanini |
| 4,737,036 A | 4/1988 | Offermann |
| 4,946,286 A | 8/1990 | Purkapile |
| 5,284,389 A | 2/1994 | Lumsden |
| 5,441,752 A | 8/1995 | Sandin |
| 5,461,968 A | 10/1995 | Portman |
| 5,478,586 A | 12/1995 | Connor |
| 6,422,133 B1 * | 7/2002 | Brady .......................... 99/297 |

FOREIGN PATENT DOCUMENTS

GB 395548 7/1933

* cited by examiner

Primary Examiner—Anthony Weier
(74) Attorney, Agent, or Firm—Morrison & Foerster LLP

(57) ABSTRACT

A steeping apparatus is for steeping a solid food material in a liquid to impart a flavor of the solid food material to the liquid to produce a flavored beverage. A container is provided to hold the solid food material and the liquid. A plunger is movable with respect to the container between a first plunger position and a second plunger position. The plunger includes a filter element that, as the plunger moves from the first plunger position to the second plunger position, permits the flow of liquid therethrough but that substantially inhibits the passage of solid food material therethrough. A buffer element is selectable between a closed position and an open position. When the plunger is at the second plunger position and the buffer element is selected to be at the buffering position, the solid food material is substantially decoupled from the flavored beverage. When the buffer element is at the non-buffering position, the solid food material is not substantially decoupled from the flavored beverage.

1 Claim, 3 Drawing Sheets

FRENCH PRESS COFFEE MAKER WITH ASSEMBLY TO SELECTIVELY REDUCE CONTACT OF GROUNDS WITH LIQUID COFFEE

TECHNICAL FIELD

The present application is in the field of French press coffee makers and, more particularly, is directed to a French press coffee maker that has a plunger assembly that is adjustable to selectively separate the coffee grounds from the liquid coffee.

BACKGROUND

It is well known to use French press coffee makers to "steep" coffee. Namely, boiling water is mixed with coarsely ground coffee in a container. After the coffee is allowed to steep for several minutes, one presses down on a handle, thus containing the grounds in the bottom of the container beneath a perforated disk. The disk is perforated to allow the liquid coffee to pass through the disk as the disk is being lowered through the liquid. The coffee can then be poured (or drunk directly) from the container while the grounds are prevented from flowing out of the container.

A disadvantage with French press coffee makers is that, as the grounds remain in contact with the water past the preferred steeping period, the coffee tends to become very strong and bitter, or just plain "funky" tasting. Thus, it is generally recommended to remove the coffee right at the end of the preferred steeping period.

However, this is impractical in some situation. For example, one might have a French press type commuter mug. It would be impractical to remove the coffee from the mug while commuting. As another example, thermal carafe French press coffee makers are becoming common, as they conveniently keep the coffee contained within them hot while the coffee sits, for example, at a dining table after a meal. In this case, convenience would be compromised by having to remove the coffee (or the grounds) at the end of the preferred steeping period.

SUMMARY

A steeping apparatus is for steeping a solid food material in a liquid to impart a flavor of the solid food material to the liquid to produce a flavored beverage. A container is provided to hold the solid food material and the liquid. A plunger is movable with respect to the container between a first plunger position and a second plunger position. The plunger includes a filter element that, as the plunger moves from the first plunger position to the second plunger position, permits the flow of liquid therethrough but that substantially inhibits the passage of solid food material therethrough. A buffer element is selectable between a closed position and an open position. When the plunger is at the second plunger position and the buffer element is selected to be at the buffering position, the solid food material is substantially decoupled from the flavored beverage. When the buffer element is at the non-buffering position, the solid food material is not substantially decoupled from the flavored beverage.

DETAILED DESCRIPTION

Figure 1:
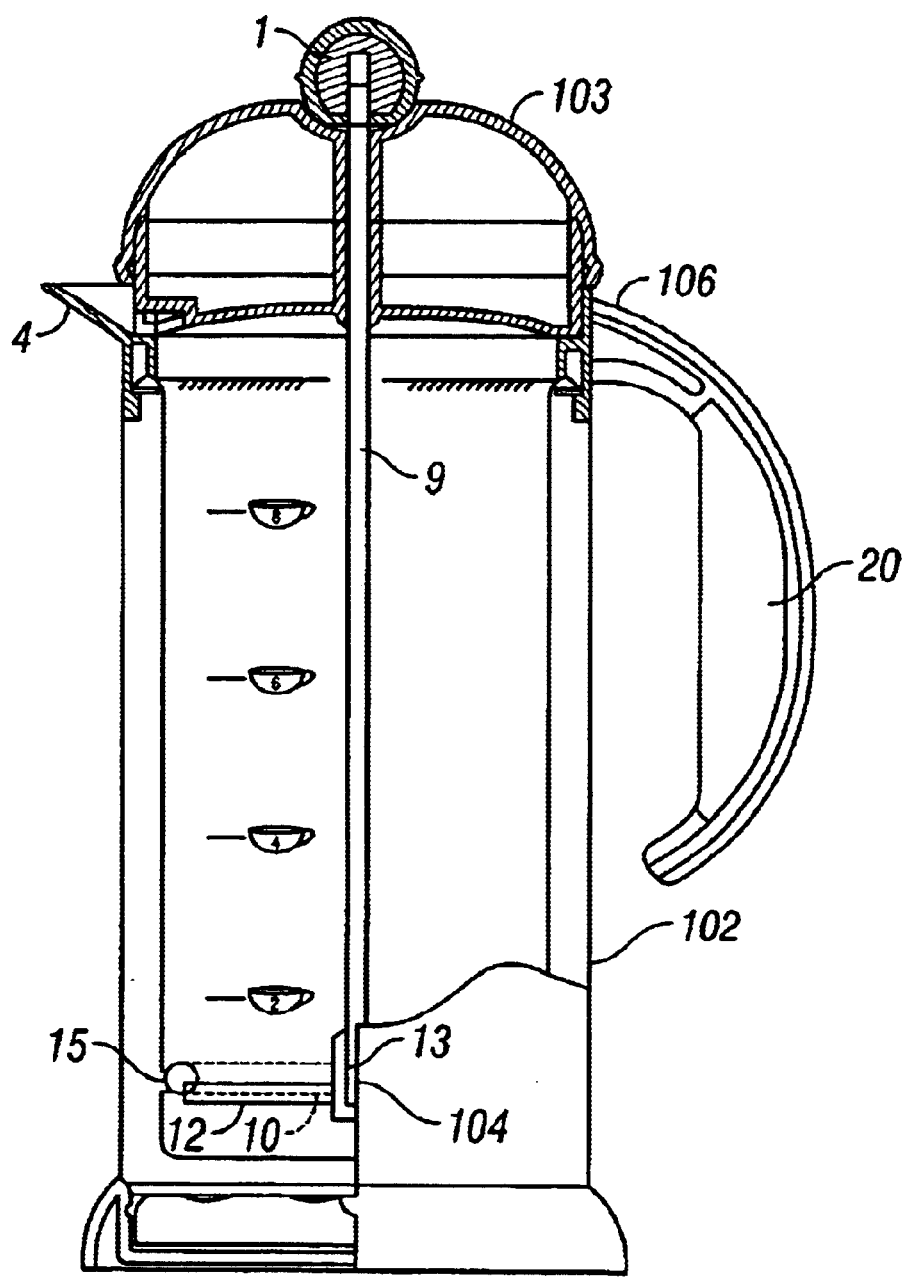
FIG. 1 illustrates a French press type coffee maker in accordance with an embodiment of the invention.

FIG. 1 illustrates—in partial breakaway—a French press coffee maker 100 in accordance with an embodiment of the invention. The French press coffee maker 100 includes a thermal carafe (insulated) container 102. In other embodiments, the container is made of other materials, insulated or otherwise, such as glass, non-insulated stainless steel, or plastic. Attached to the container 102 is a handle 20, and the container also includes a spout 4. The coffee maker 100 further includes a removable lid 103 that, when removed from the container 102, exposes an opening 106 at the top of the container 102 and otherwise covers the opening 106.

The coffee maker 100 also includes a plunger assembly 104, including a screen 10 held in place over a perforated "spring disk" 12 by a spring 15. The plunger assembly 104 is illustrated in greater detail in the remaining figures. The plunger assembly 104 is attached to a shaft 9 that protrudes through the lid 103. The upper end of the shaft 9 terminates at a knob 1. The shaft 9 is shown in FIG. 1 as a cylindrical rod, but the shaft is not limited to having any particular shape.

In use, a user removes the lid 103, along with the plunger assembly 104, and pours into the container 102 coffee grounds and hot water (at or near the boiling point temperature). The user then replaces the lid 103 but leaves the shaft 9 in a raised position so that the plunger assembly 104 is near or above the top surface of the water in the container 102. This allows the water to freely interact with the coffee grounds. After a steeping period, the user then uses the knob 1 to lower the shaft 9 such that the grounds are trapped beneath the plunger assembly 104, and the resulting coffee can be poured from the container 102 via the spout 4.

Figure 2:
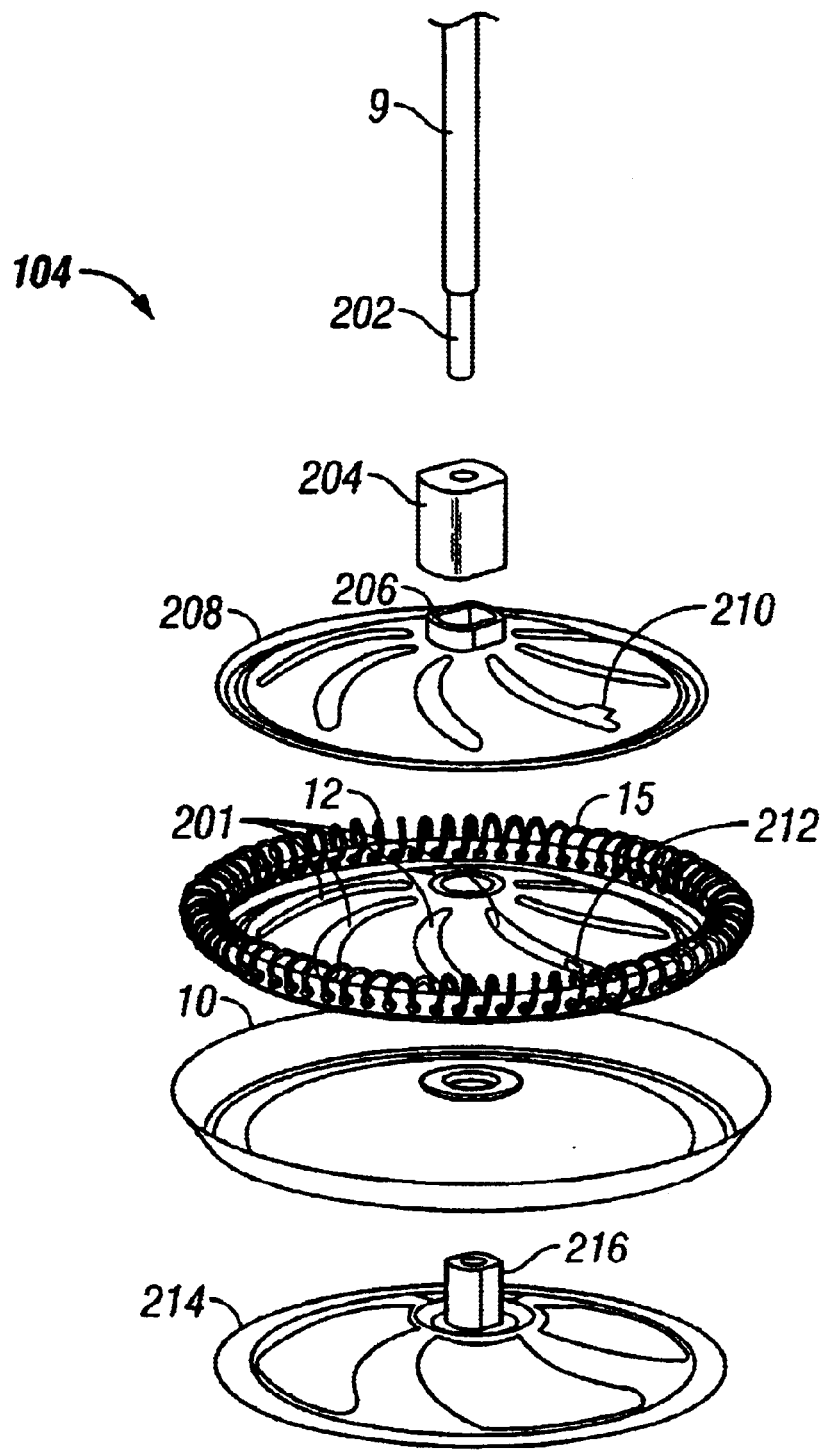
FIG. 2 illustrates a perspective exploded view of the plunger and buffer element of the FIG. 1 coffee maker.
Figure 3:
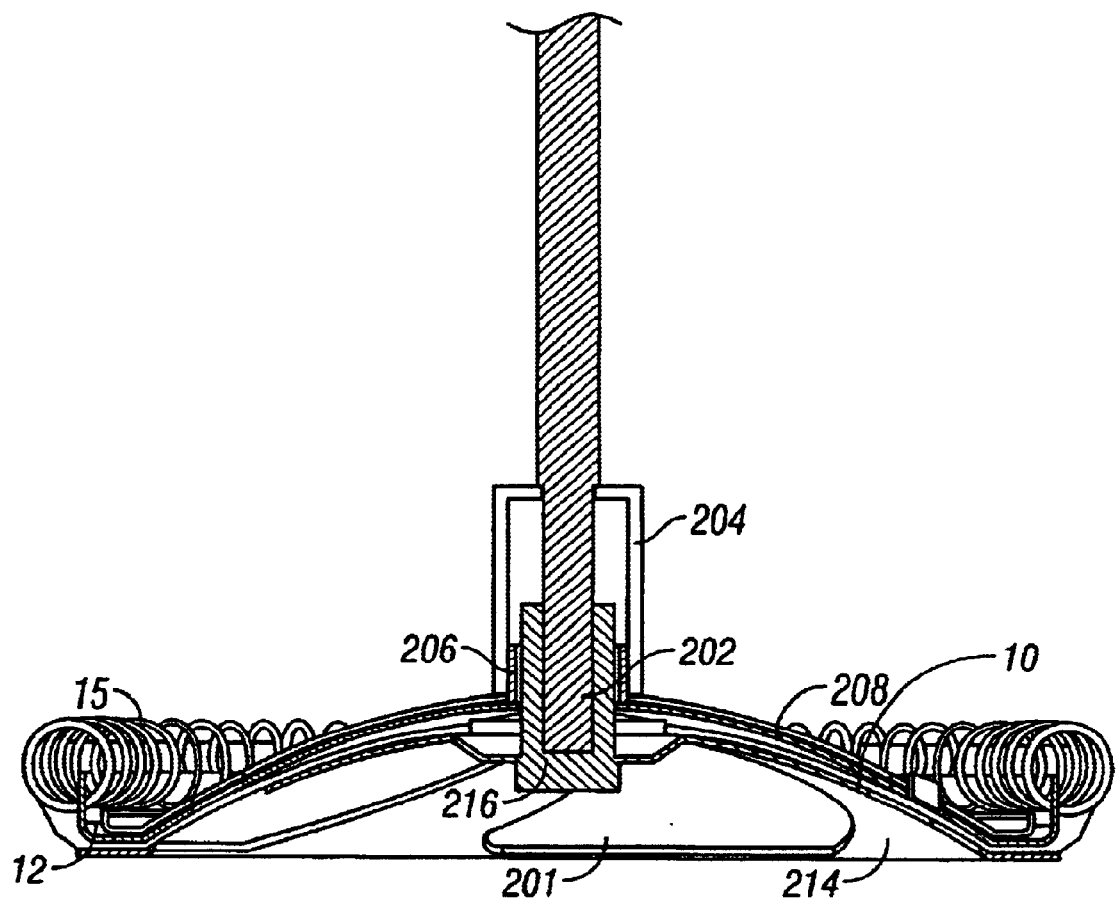
FIG. 3 illustrates an assembled cross-sectional view of the plunger and buffer element, looking from the side.

The plunger assembly 104 is now discussed in greater detail with particular reference to FIGS. 2 and 3. Broadly speaking, the plunger assembly is configured such that Referring to FIG. 2, the plunger assembly 104 is shown in an exploded view. FIG. 3 illustrates the plunger assembly in an assembled cross-sectional view. As discussed above, the spring disk 12 includes a plurality of perforations. In FIG. 2, the perforations are indicated by reference numeral 201. The spring disk 12 also includes a central hole through which, in assembly, the rod 9 is placed. The screen 10 is also shown in FIG. 2. In addition to the spring disk 12, the plunger assembly 104 also includes a shutoff disk 208 over the spring disk 12 and a retaining disk 214 under the spring disk 12. As can be seen from FIG. 2, and in the assembled view of FIG. 3, the retaining disk 214 includes a crimped threaded post 216 that, in assembly, protrudes through a central hole in the screen 10, through a central hole in the spring disk 12, and up into a shoulder 204. The shoulder 204 is positioned over a crimped shoulder insert 206. The plunger assembly is held together as a result of a threaded section 202 of the rod 9 being threaded into the crimped threaded post 216 of the retaining disk 214. The shoulder 204, the crimped shoulder insert 206, the hole in the spring disk 12, and the crimped threaded post 216 all have flat edges to hold the shutoff disk 208, spring disk 12, and retaining disk 214 in a consistent orientation with respect to each other.

In operation, to lower the plunger assembly 104 through the steeped coffee, the shutoff disk 208 is positioned with respect to the spring disk 12 and the retaining disk 214 such that the perforations 201 in the spring disk 12 are exposed. As a result, the steeped coffee can flow freely through the plunger assembly 104. To minimize the contact of the grounds with the steeped coffee, it is desirable to obstruct the perforations 201 in the spring disk 12. With respect to the described embodiment, to do this, the rod 9 is rotated about fifteen degrees clockwise. As a result, the shoulder 204 turns the shutoff disk 208 such that the notch 210 on the shutoff disk 208 is rotated into the tab 212 on the spring disk 12. To expose the perforations 201 in the spring disk 12, the rod 9 is rotated about fifteen degrees counter-clockwise. The notch 210 on the shutoff disk 208 is rotated away from the tab 212 on the spring disk 12, and the tab 212 stops the shutoff disk 208 as the tab 212 touches the shutoff disk 212 opposite the notch 210.

During the open and close operation, the spring disk 12 and the screen are held stationary as a result of the force by the spring 15 against the inner surface of the container 102. In addition, the retaining disk 214 is held stationary due to the tight fit of the threaded post 216 into the opening in the spring disk 12. Thus, as the rod 9 is being turned during the open or close operation, the rod 9 is being further threaded or unthreaded in the threaded post 216 as the case may be.

It can be seen then, that by obstructing the perforations 201 in the spring disk 12, the coffee grounds are substantially decoupled from the coffee. As a result, the steeping process is stopped (or at least substantially retarded), and the "funky" over-steeped taste is avoided.

What is claimed is:

1. A steeping method, comprising:

filling a container with a liquid and a solid food material;

allowing the solid food material to maintain contact within the liquid to generate a flavored beverage;

moving a plunger through the flavored beverage to trap the solid food material at a bottom portion of the container; and while the plunger is trapping the solid food material at the bottom portion of the container, manipulating a buffer element to substantially decouple the solid food material from the flavored beverage wherein moving the plunger through the flavored beverage includes moving a rod, that protrudes through a lid of the container, in a downward vertical direction such that the plunger, attached to a bottom portion of the rod, moves concurrently with the rod to trap the food material at the bottom portion of the container, when the plunger is trapping the food material at the bottom of the container, an outer circumference of the plunger is in frictional contact with the inside wall of the container, and manipulating the buffer element includes rotating the rod about an axis of the rod such that the frictional contact of the plunger with the inside wall of the container holds the plunger element stationary, while the buffer element rotates about the axis of the rod to cover holes in the plunger, thereby substantially decoupling the sold food material from the flavored beverage.

* * * * *